US008472482B2

(12) United States Patent
Cerreta et al.

(10) Patent No.: US 8,472,482 B2
(45) Date of Patent: Jun. 25, 2013

(54) MULTIPLE INFINIBAND PORTS WITHIN A HIGHER DATA RATE PORT USING MULTIPLEXING

(75) Inventors: William Cerreta, San Mateo, CA (US); Keith Iain Wilkinson, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 166 days.

(21) Appl. No.: 12/259,260

(22) Filed: Oct. 27, 2008

(65) Prior Publication Data

US 2010/0103954 A1 Apr. 29, 2010

(51) Int. Cl.
H04J 1/02 (2006.01)
(52) U.S. Cl.
USPC ............................. 370/498; 370/230; 370/235
(58) Field of Classification Search
USPC .......................................... 370/498, 230, 235
See application file for complete search history.

(56) References Cited

U.S. PATENT DOCUMENTS

| | | | |
|---|---|---|---|
| 5,765,032 A | 6/1998 | Valizadeh | |
| 5,835,494 A | 11/1998 | Hughes et al. | |
| 5,883,893 A | 3/1999 | Rumer et al. | |
| 5,959,968 A | 9/1999 | Chin et al. | |
| 5,991,817 A | 11/1999 | Rowett et al. | |
| 6,061,349 A | 5/2000 | Coile et al. | |
| 6,104,717 A | 8/2000 | Coile et al. | |
| 6,163,543 A | 12/2000 | Chin et al. | |
| 6,298,061 B1 | 10/2001 | Chin et al. | |
| 6,430,155 B1 | 8/2002 | Davie et al. | |
| 6,430,201 B1 * | 8/2002 | Azizoglu et al. | 370/535 |
| 6,512,744 B1 | 1/2003 | Hughes et al. | |
| 6,643,267 B1 | 11/2003 | Karia et al. | |
| 6,665,497 B1 | 12/2003 | Hamilton-Gahart et al. | |
| 6,675,200 B1 | 1/2004 | Cheriton et al. | |
| 6,757,348 B1 * | 6/2004 | Vila et al. | 375/372 |
| 6,826,196 B1 | 11/2004 | Lawrence | |
| 6,845,102 B1 | 1/2005 | Bendelac et al. | |
| 6,993,048 B1 | 1/2006 | Ah Sue | |
| 6,996,108 B1 | 2/2006 | Budhraja | |
| 7,110,363 B1 | 9/2006 | Lawrence et al. | |
| 7,111,102 B2 | 9/2006 | Doak et al. | |
| 7,114,005 B2 | 9/2006 | McDaniel | |
| 7,133,416 B1 * | 11/2006 | Chamdani et al. | 370/466 |
| 7,231,518 B1 | 6/2007 | Bakke | |
| 7,254,647 B2 * | 8/2007 | Mann | 709/250 |
| 7,295,572 B1 | 11/2007 | Haapala | |
| 7,310,695 B2 | 12/2007 | Epps et al. | |
| 7,346,058 B1 | 3/2008 | Natarajan et al. | |
| 7,366,902 B2 | 4/2008 | Bakke | |
| 7,382,805 B1 * | 6/2008 | Raza et al. | 370/528 |
| 7,433,948 B2 | 10/2008 | Edsall et al. | |
| 7,433,988 B2 | 10/2008 | Doak et al. | |
| 7,437,507 B2 | 10/2008 | Sharma et al. | |
| 7,656,905 B2 * | 2/2010 | Sheth et al. | 370/503 |
| 7,995,696 B1 * | 8/2011 | Norrie | 375/372 |
| 2003/0099260 A1 * | 5/2003 | Bunton | 370/535 |

(Continued)

*Primary Examiner* — Kibrom T Hailu
(74) *Attorney, Agent, or Firm* — Cesari and McKenna, LLP

(57) ABSTRACT

In particular embodiments, there are provided methods and apparatus including receiving one or more Infiniband signal streams, de-serializing the received one or more Infiniband signal streams to generate a corresponding one or more parallel data streams, de-serializing further including selectively adding or deleting a control symbol associated with a quiescent period of the one or more received signal streams, time-division multiplexing the generated one or more parallel data streams, and serializing the time division multiplexed one or more parallel data streams.

15 Claims, 6 Drawing Sheets

U.S. PATENT DOCUMENTS

| | | |
|---|---|---|
| 2003/0149783 A1 | 8/2003 | McDaniel |
| 2003/0235215 A1* | 12/2003 | Carrel et al. ............... 370/506 |
| 2004/0156390 A1* | 8/2004 | Prasad et al. ............... 370/466 |
| 2005/0025075 A1 | 2/2005 | Dutt et al. |
| 2005/0213581 A1 | 9/2005 | Ah Sue |
| 2006/0087989 A1 | 4/2006 | Gai et al. |
| 2006/0098681 A1 | 5/2006 | Cafiero et al. |
| 2006/0101140 A1 | 5/2006 | Gai et al. |
| 2006/0155831 A1 | 7/2006 | Chandrasekaran |
| 2006/0168192 A1 | 7/2006 | Sharma et al. |
| 2006/0251067 A1 | 11/2006 | DeSanti et al. |
| 2006/0268943 A1* | 11/2006 | DeCusatis et al. ............ 370/539 |
| 2006/0277361 A1 | 12/2006 | Sharma et al. |
| 2006/0294234 A1 | 12/2006 | Bakke et al. |
| 2007/0094464 A1 | 4/2007 | Sharma et al. |
| 2007/0094465 A1 | 4/2007 | Sharma et al. |
| 2007/0094466 A1 | 4/2007 | Sharma et al. |
| 2007/0101134 A1 | 5/2007 | Parlan et al. |
| 2007/0143552 A1 | 6/2007 | Rastogi et al. |
| 2008/0273880 A1* | 11/2008 | Wang et al. ................... 398/139 |
| 2009/0245110 A1* | 10/2009 | Connolly et al. ............. 370/236 |
| 2009/0257514 A1* | 10/2009 | Connolly et al. ............. 375/257 |

* cited by examiner

MULTIPLE INFINIBAND PORTS WITHIN A HIGHER DATA RATE PORT USING MULTIPLEXING

FIELD OF THE DISCLOSURE

The present disclosure relates generally to optimizing Infiniband ports. More specifically, the disclosure relates to multiple single or double data rate Infiniband ports being time division multiplexed into a single double or quad data rate Infiniband port to optimize the use of the higher bandwidth provided by the higher rate port.

BACKGROUND

Generally used in high-performance computing systems, Infiniband is a bidirectional point-to-point serial link often used to connect processors to storage devices and other high speed peripherals. Infiniband signals currently have a connection signal rate of 2.5 gigabit per second for single data rate (SDR), 5 gigabit per second for double data rate (DDR), and 10 gigabit per second for quad data rate (QDR), and are encoded with the industry standard 8B/10B encoding (every 10 bits sent carries 8 bits of data). Thus, Infiniband ports carry 2, 4, and 8 gigabits per second of useful data for, respectfully, single, double, and quad data rates.

The Infiniband architecture allows for the design of networking switches with single data rate, double data rate, and quad data rate ports. Ports are capable of detecting the capabilities of the attached devices and automatically switching between rates. Currently, when utilizing a higher data rate port at a lower rate, the entire port is consumed. This is inefficient, as the excess bandwidth within the switch cannot be utilized.

OVERVIEW

A method in particular embodiments may include receiving one or more Infiniband signal streams, de-serializing the received one or more Infiniband signal streams to generate a corresponding one or more parallel data streams, de-serializing further including selectively adding or deleting a control symbol associated with a quiescent period of the one or more received signal streams, time-division multiplexing the generated one or more parallel data streams, and serializing the time division multiplexed one or more parallel data streams.

An apparatus in particular embodiments may include an input Infiniband network communications interface configured to receive one or more Infiniband signal streams, a processing and control unit operatively coupled to the input Infiniband network communication interface, the processing and control unit configured to de-serialize the received one or more Infiniband signal streams to generate a corresponding one or more parallel data streams, where de-serializing includes selectively adding or deleting a control symbol associated with a quiescent period of the one or more received signal streams, to time-division multiplex the generated one or more parallel data streams, and to serialize the time division multiplexed one or more parallel data streams, and an output Infiniband network communication interface operatively coupled to the processing and control unit configured to output one or more of the serialized parallel data streams.

DETAILED DESCRIPTION

Figure 1:
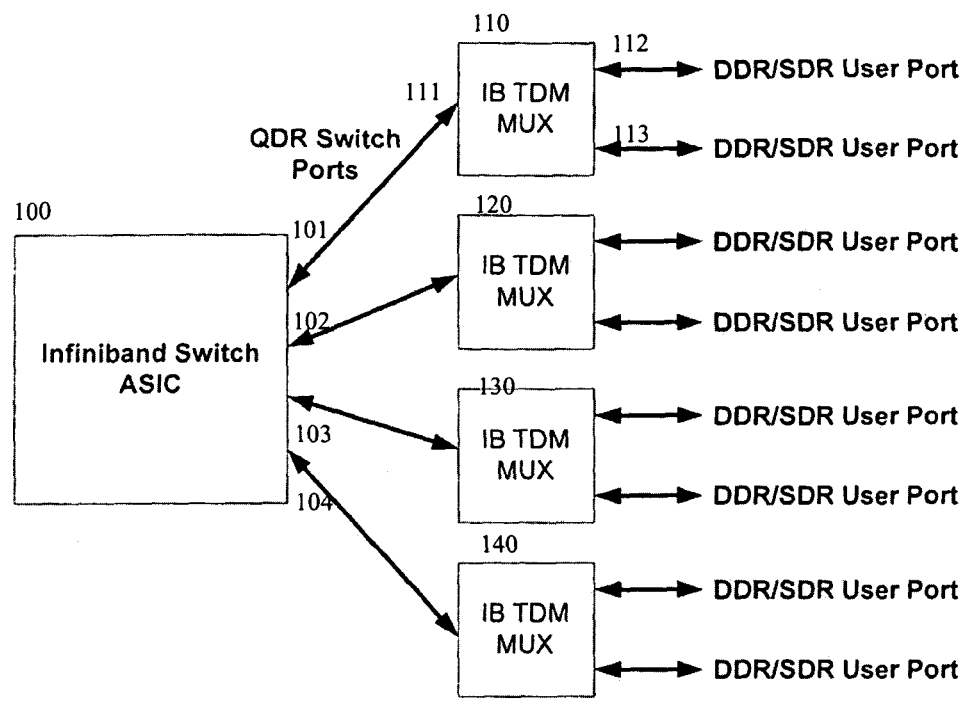
FIG. 1 is an example block diagram of an Infiniband system with time division multiplexed signals incorporating one or more embodiments of the present disclosure.

FIG. 1 is a block diagram of an Infiniband system with time division multiplexed signals incorporating one or more embodiments of the present disclosure. Referring to FIG. 1, in one embodiment of the present disclosure, the system comprises of an Infiniband switch 100 (which may be, for example, an application specific integrated circuit (ASIC)), connected via a quad data rate (QDR) Infiniband port 101, to the QDR Infiniband port 111 of a time division multiplexer 110. As shown, in one embodiment, the time division multiplexer 110 is connected via lower data rate Infiniband ports 112, 113, which may be double data rate Infiniband ports or single data rate Infiniband ports, to other peripheral devices via their own lower data rate Infiniband ports. In another embodiment, multiple time division multiplexers 110, 120, 130, 140, may be coupled to the Infiniband switch 100, via the QDR ports 101-104.

Referring to FIG. 1, the time division multiplexers 110 in one embodiment are bi-directional and accordingly, may be configured for the process of multiplexing and de-multiplexing the lower and higher data rate signals. As further shown in FIG. 1, the Infiniband switch 100 may include four output ports 101-104, which results in eight logical ports, but four physical layer ports.

As described in further detail below, in particular embodiments, data streams from multiple lower rate Infiniband ports, such as single data rate or double data rate Infiniband ports, may be time division multiplexed (TDM) to aggregate the two or more data streams onto a single higher rate Infiniband port, such as a double data rate or quad data rate Infiniband port. In particular embodiments, the data is time division multiplexed into the higher data rate port at an interval smaller than the frame length. Time division multiplexing the data stream at an interval smaller than the frame length in particular embodiments allows low latency multiplexing as the entire frame does not need to be buffered before it is transmitted on the higher data rate port. In particular embodiments, combining multiple data streams may be performed at the physical link layer to avoid complicated decoding of the signal.

In particular embodiments, a predetermined control symbol, herein referred to as a K.28.6 symbol, of the 10B code of the Infiniband signal may be introduced to compensate for obstacles presented by the quiescent periods during initialization. The K.28.6 symbol is a predetermined control symbol used in standard 8B/10B encoding, which represents a sequence of bits, but does not have a corresponding 8 b data byte. For example, in particular embodiments, the K.28.6 control symbols may be used to denote the quiescent periods where no signal is present on the data transmission wire, and further the K.28.6 control symbols in particular embodiments may be used to pad the stream when necessary.

Figure 2:
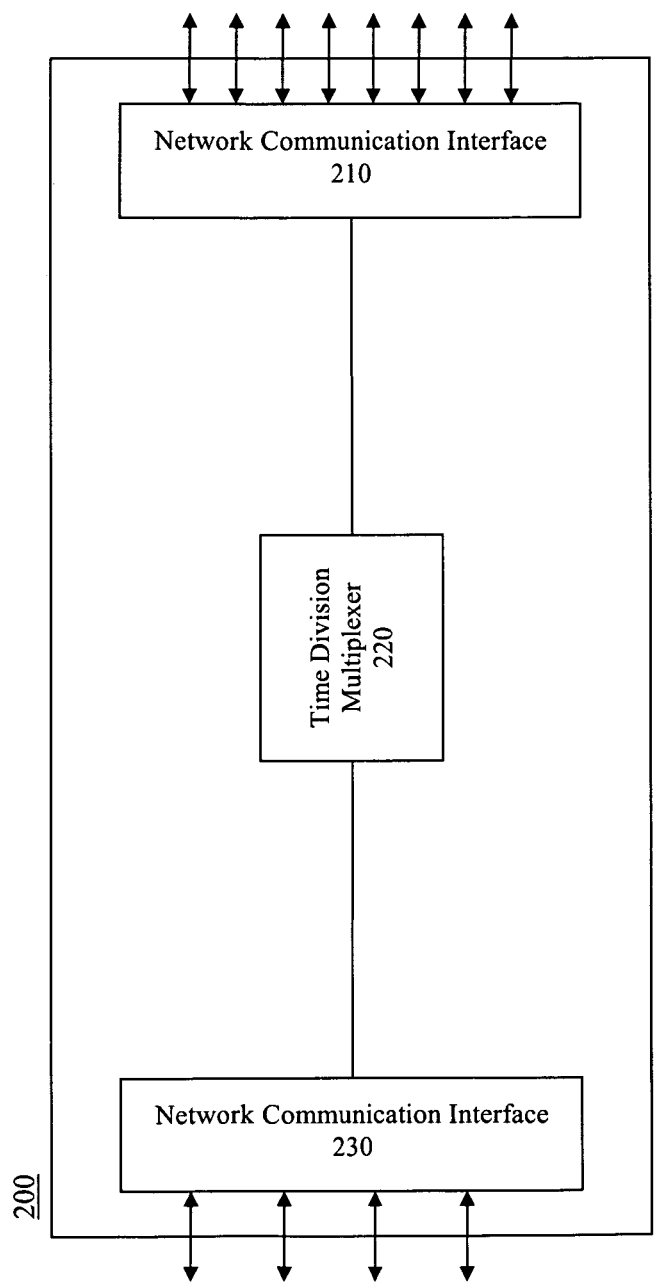
FIG. 2 is an example representation of an Infiniband apparatus for use with the one or more embodiments of the present disclosure.

FIG. 2 is an example representation of a network apparatus for use with the one or more embodiments of the present disclosure. Referring to FIG. 2, switch 200 in particular embodiments may include a network communication interface 210 of lower data rate ports comprising, for example, one or more of a double rate Infiniband port or single rate Infiniband port, and a network communication interface 230 of higher data rate ports including, for example, one or more of a double rate Infiniband port or quad rate Infiniband port. As shown in FIG. 2, the network interfaces 210, 230 may be coupled to a time division multiplexer 220 which may be configured to optimize the Infiniband ports by time division multiplexing data streams from multiple lower rate Infiniband ports onto a single higher rate Infiniband port.

Still referring to FIG. 2, in one embodiment, serializing and de-serializing of the input and output data signals, as described below, may be performed by the time division multiplexer 220 of the network apparatus 200. In another aspect, serializing and de-serializing of the input and output data signals may alternatively be performed at the network interfaces 210, 230 of the network apparatus 200.

Figure 3:
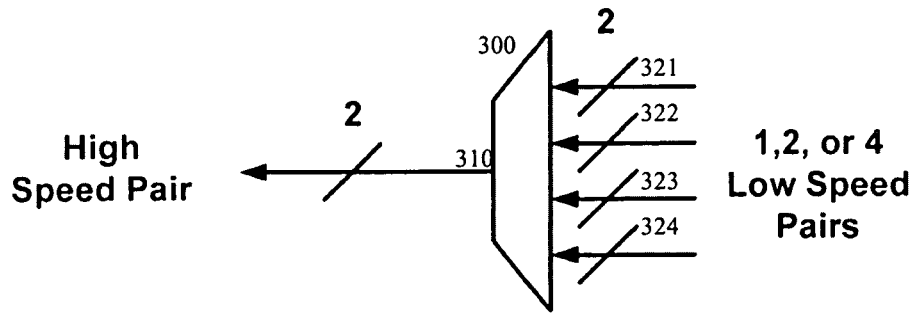
FIG. 3 is an example representation of a time division multiplexer with high speed Infiniband port configured as a transmitter for use in one or more embodiments of the disclosure.

FIG. 3 is an example representation of a time division multiplexer with high speed Infiniband port configured as a transmitter for use in one or more embodiments of the disclosure. Referring to FIG. 1 and 3, in particular embodiments, the time division multiplexer 300, 110 may be configured to combine the signals from the lower data rate Infiniband ports 321-324, into a single higher data rate Infiniband port 310. That is, in particular embodiments, the time division multiplexer 300 may be configured to multiplex the signals from the multiple lower data rate ports 321-324 onto a single higher data rate port 3 10. Referring to FIG. 3, the higher rate Infiniband port 310 may be a quad data rate (QDR) Infiniband port or a double data rate (DDR) Infiniband port, and the lower data rate Infiniband ports 321-324 may be either DDR Infiniband ports or single data rate (SDR) Infiniband ports.

Still referring to FIG. 3, in particular embodiments, where the higher data rate Infiniband port 310 is a QDR Infiniband port, up to four separate peripheral ports can be connected via the lower data rate Infiniband ports 321-324, where the peripheral ports are SDR Infiniband ports. In the case where the peripheral ports are DDR Infiniband ports, two lower speed ports may be connected for multiplexing and transmission through the multiplexer 300 and the higher rate Infiniband port 3 10. Further, in particular embodiments, an SDR Infiniband port and a DDR Infiniband port may be multiplexed onto the same QDR high data rate Infiniband port. Still referring to FIG. 3, where the higher data rate Infiniband port 310 includes a DDR Infiniband port, two SDR Infiniband port peripheral ports may be connected for multiplexing and transmission through the multiplexer 300 and the higher data rate Infiniband port 310, via the lower data rate Infiniband ports 321-322 of the multiplexer 300.

Figure 4:
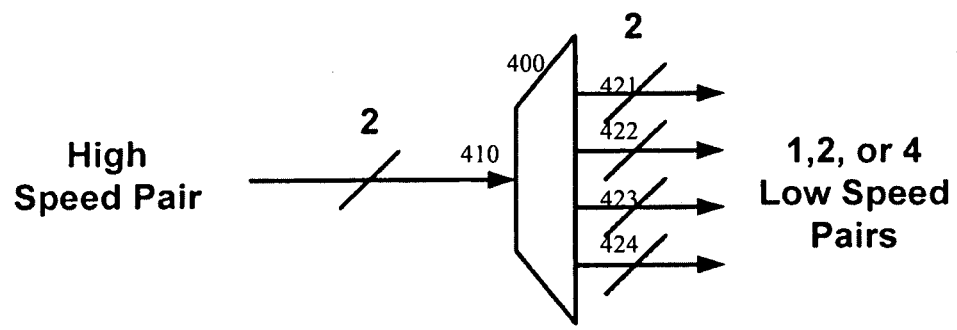
FIG. 4 is an example representation of a time division multiplexer with high speed Infiniband port configured as a receiver for use in one or more embodiments of the disclosure.

FIG. 4 is an example representation of a time division multiplexer with high speed Infiniband port configured as a receiver for use in one or more embodiments of the disclosure. Referring to FIGS. 1 and 4, in particular embodiments, the time division multiplexer 400, 110 may be used to split the signal from the higher data rate Infiniband port 410, for example, a quad data rate Infiniband port. Further, a double rate Infiniband port may be configured as the higher rate port, for multiple signals destined for different peripheral device ports via the lower speed Infiniband port 421-424. In this case, the time division multiplexer 400 in particular embodiments may be configured as a de-multiplexer, splitting the signal from the higher rate Infiniband port 410 into multiple signals for transmission through the lower rate Infiniband ports 421-424.

Still referring to FIG. 4, in particular embodiments, where the higher rate Infiniband port 410 includes a QDR port, a single signal may be received via the higher rate Infiniband port 410 that includes up to four SDR port signals destined for multiple SDR port peripheral ports, and de-multiplexed for transmission through the lower data rate ports 421-424. Alternatively, the signal received via the higher rate Infiniband port 410 may include contain up to two DDR port signals destined for up to two DDR port peripheral ports, and de-multiplexed for transmission through the lower data rate ports 421-422. In the case where the higher rate Infiniband port 410 includes a DDR Infiniband port, a single signal can be received via the higher rate Infiniband port 410 that can contain up to two SDR port signals destined for up to two SDR port peripheral ports, and de-multiplexed for transmission through the lower data rate ports 421-422.

Figure 5:
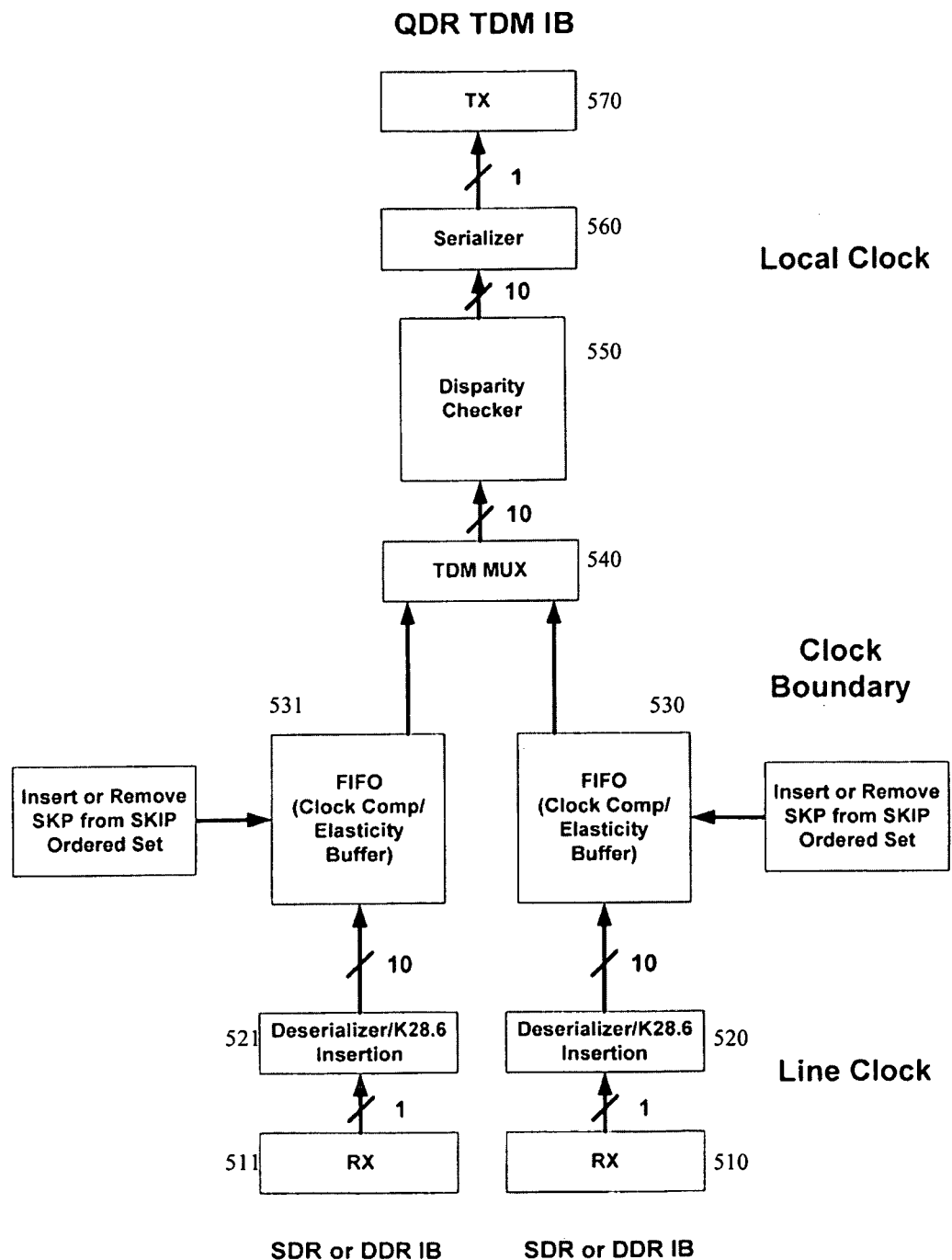
FIG. 5 is an example data flow of time division multiplexing in an Infiniband multiplexer with high speed Infiniband port configured as a transmitter in one embodiment.

FIG. 5 is an example data flow for time division multiplexing in an Infiniband multiplexer with high speed Infiniband port configured as a transmitter in one embodiment. Referring to FIGS. 3 and 5, in particular embodiments, the lower rate port receivers 321-322 (for example, a physical layer interface that accepts a differential pair of wires, in this case SDR or DDR Infiniband signal pairs) may be configured to convert the external signal from the lower data rate peripheral ports to electrical levels which are suitable for devices 510, 511. The electrical levels, transmitted as a serial stream, for example 1 bit at 5 Gigabits per second (Gbps), are converted to a parallel interface, for example 10 bits at 500 Megabits per second (Mbps), by the de-serializer 520, 521, respectively. In one aspect, as the data stream is being converted, the K.28.6 control symbols may be added to pad the data stream, for example a SDR data stream at a 2.5 Gigabits per second (Gbps) data rate, to reach the desired data rate, corresponding to, for example either 5 Gbps for DDR or 10 Gbps for QDR.

In particular embodiments, the K.28.6 control symbol may include an encoded skip signal to fill the quiescent periods of the data stream. In this manner, in particular embodiments, automatic conversion of quiescent periods of signals to a corresponding quiescent state may be avoided, thus preventing the possibility of loss or corruption of data in the signals. For example, if the input lower data rate signal is two SDR port signals, and the output higher data rate signal is QDR which has a data rate four times that of a single SDR, the K.28.6 control symbol may be used to pad the two SDR signals up to a data rate sufficiently high to fill the QDR data stream.

Still referring to FIG. 5, as shown, clock compensation 530, 531 may be performed to transmit the parallel interface to the FIFO for elasticity buffering. That is, in particular embodiments, a data stream is provided to the buffer at the rate of the external interface. In particular embodiments, the K.28.6 control symbols may be added or deleted to/from the data stream to match the transmission data rate of the time division multiplexer port. After matching the data rate, the two data streams are time division multiplexed by the multiplexer 540. The multiplexed output stream in particular embodiments includes one symbol from one stream, followed by one symbol from the other stream, with the K.28.6 control symbols inserted where necessary to pad the data rate. As shown, in particular embodiments, the overall output data rate from the time division multiplexer may be twice the rate of each individual original stream after the streams are padded with the K.28.6 control symbol.

Accordingly, in particular embodiments, if the input data streams each include SDR Infiniband signals, and the desired output data rate is a QDR Infiniband data rate, the two SDR Infiniband signals are each padded with respective K.28.6 control symbols to increase the data rate to the equivalent of half the QDR rate. That is, each of the 2.5 Gbps SDR signals are padded with the K.28.6 control signals to result in 5 Gbps signals, which is half the rate of a 10 Gbps QDR rate. Once combined via time division multiplexing, the output data stream includes a 10B symbol from the first data stream, followed by a 10B symbol from the second data stream, followed by two K.28.6 control symbols (one K.28.6 control symbol from each of the two padded SDR signals), followed by another 10B symbol from the first data stream, and another 10B symbol from the second data stream, and so on until the entire combined signal was composed. In this manner, the resulting data rate is at the 10 Gbps quad data rate, and is comprised of two SDR signals padded with the K.28.6 control symbols.

In yet another embodiment, in the case where the two lower data rate input signals are DDR data streams at 5 Gbps, and the desired output higher data rate signal is QDR at 10 Gbps, the combined data rate of the two input signals is already that of a QDR signal, and thus padding by the K.28.6 control symbols is not necessary, and the output QDR data stream may comprise of alternating symbols from the first DDR signal and the second DDR signal.

Referring still to FIG. 5, once the two lower data rate signals are multiplexed via time division multiplexing in the multiplexer 540, in particular embodiments, the higher data rate stream passes through a disparity checker 550. The disparity checker 550 in particular embodiments may include a logic circuit configured to monitor the running disparity of the data stream. If the disparity rules are violated, then a corresponding symbol is used as an index into a lookup table and replaced. The new symbol may be the same character, but with opposite disparity. Referring yet again to FIG. 5, after the data stream passes the disparity check (550), the data stream is passed through a serializer 560 where parallel interface (for example 10 bits at 1 Gbps) is converted back into a serial data stream (1 bit at 10 Gbps) which is sent to a high data rate Infiniband port, such as a QDR Infiniband port, configured as a transmitter 570. In particular embodiments, the transmitter 570 may include a physical layer interface, which drives a differential pair of wires including, for example, a high data rate Infiniband signal pair, and the internal signal is converted to electrical levels which may be compatible for use outside the device.

Figure 6:
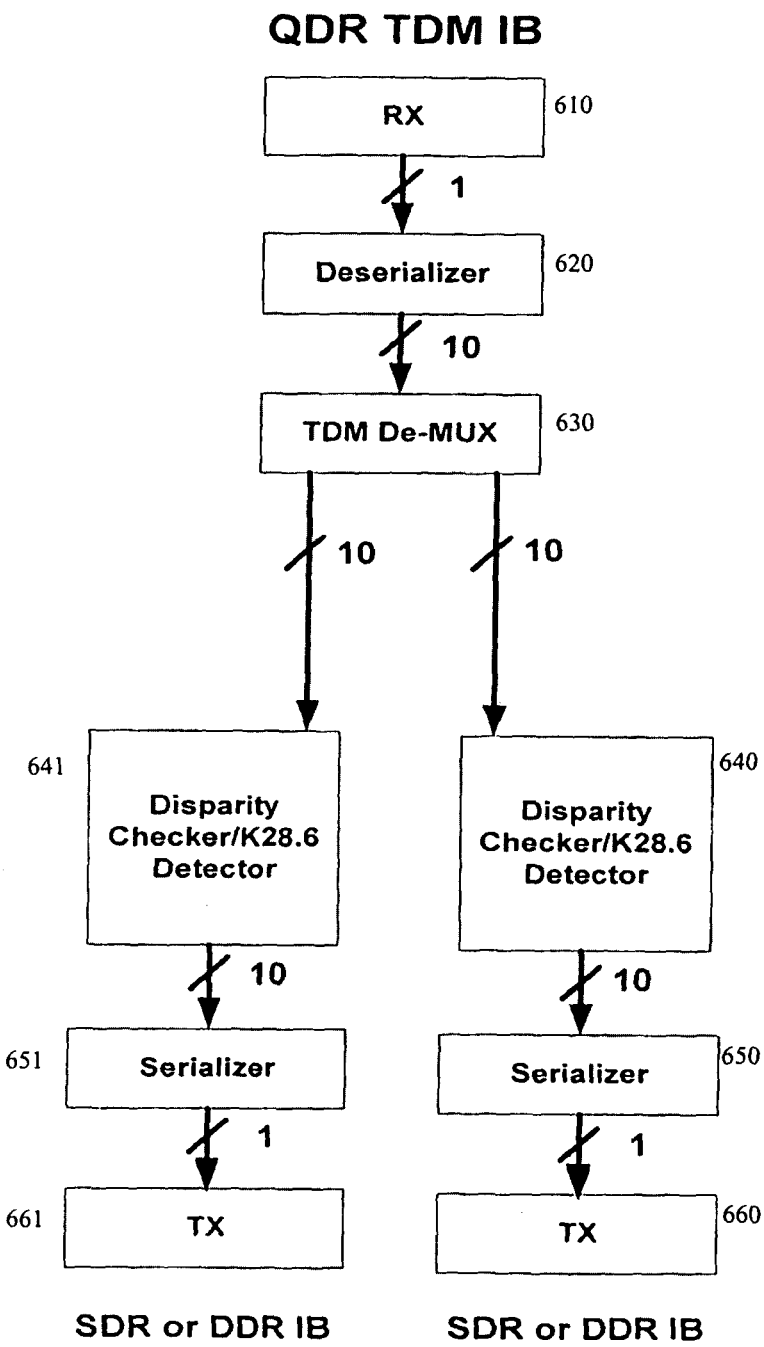
FIG. 6 is an example data flow of time division multiplexing in an Infiniband multiplexer with high speed Infiniband port configured as a receiver in one embodiment.

FIG. 6 is an example data flow for time division multiplexing in an Infiniband multiplexer with high speed Infiniband port configured as a receiver in one embodiment. Referring to FIGS. 4 and 6, in particular embodiments, the higher data rate Infiniband port 410 may be configured as a receiver including a physical layer interface configured to accept differential pairs of wires. The external signal may be converted by the receiver to electrical levels which are usable within the device 610. The electrical levels are sent through a de-serializer 620 configured to convert the serial stream to a corresponding parallel interface.

Referring back to FIG. 6, in particular embodiments, the higher data rate parallel interface signal is sent through the de-multiplexer 630, where it is split via the time division de-multiplexing procedure, into respective multiple lower data rate streams. As shown, each lower data rate stream is passed through a respective disparity checker 641, 640, which in particular embodiments, may include a logic circuit configured to monitor the running disparity of the data stream. In particular embodiments, if the disparity rules are violated, a corresponding symbol may be used as an index into a lookup table and replaced, where the symbol may be the same character but with opposite disparity.

Still referring to FIG. 6, in addition to checking the disparity of the signals, the disparity checkers 641, 640 may be further configured to perform K.28.6 control symbol detection routine. More specifically, the K.28.6 control symbol detection may include detecting a predefined percentage of K.28.6 control symbols in the data stream, and determines the true data rate of each data stream that has been encoded into the higher data rate stream. In particular embodiments, in the case where the higher data rate stream includes QDR and the lower data rate streams include SDR, the K.28.6 control symbol detector may be configured to detect that half the symbols in the data stream that are output from the multiplexer after time division multiplexing, include K.28.6 control symbols used to pad the data stream to increase the data rate to match the output QDR. In this case, the K.28.6 control symbol detector may be configured to remove the K.28.6 control symbols resulting in the true SDR stream intended to be transmitted. In the case where the entire stream is K.28.6 control symbols, the K.28.6 control symbol detector may be configured to detect this condition in the data stream as an idle pattern, denoting that the link has not been established. Accordingly, the transmitter associated with such a data stream may be configured to be turned off, as no data is to be transmitted.

Referring yet still to FIG. 6, after the signal has passed through the disparity check and the K.28.6 control symbol detector 640, 641, the output data is provided to a respective serializer 650, 651. The serializer 650, 651 may be configured to convert the lower data rate parallel interface data streams (for example, 10 bits at 250 Mbps) back to corresponding serial data streams (1 bit at 2.5 Gbps). These data streams are sent to a lower data rate Infiniband port configured for use as a transmitter 660, 661 configured, for example, as a physical layer interface that drives a differential pair of wires. In particular embodiments, the respective transmitters 660, 661 may be configured to convert the internal signal to electrical levels which are usable outside the device.

Figure 7:
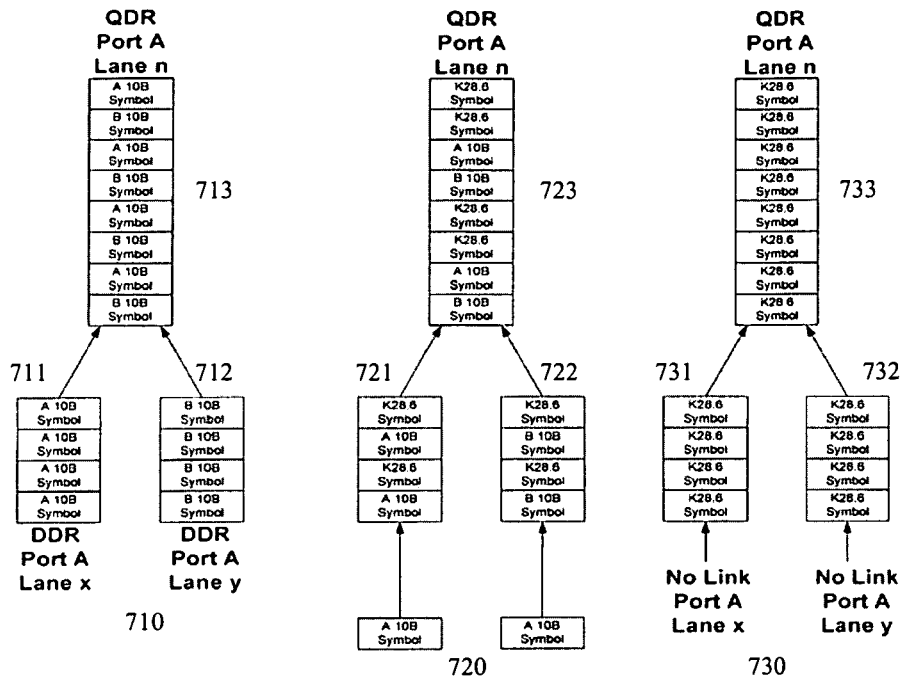
FIG. 7 is an example representation of time division multiplexing of a signal with high speed Infiniband port configured as a transmitter in one embodiment.

FIG. 7 is a representation of the time division multiplexing of a signal with high speed Infiniband port configured as a transmitter in one embodiment. Referring to FIG. 7, in particular embodiments, when DDR signal A 711 is time division multiplexed (710) with DDR signal B 712, the resulting QDR signal 713 may be composed of alternating symbols from DDR signal A 711 and DDR signal B 712. In this case, the resulting QDR signal 713 may be transmitted via a QDR Infiniband port configured as a transmitter.

Still referring to FIG. 7, in particular embodiments, when SDR signal A 721 is time division multiplexed (720) with SDR signal B 722, the resulting QDR signal 723 may be composed of a signal A 721 symbol, followed by a signal B 722 symbol, followed by a pair of K.28.6 control symbols, followed again by the signal A 721 and signal B 722 symbols, and so on. As discussed above, in particular embodiments, the K.28.6 control symbols may be added or inserted into the respective SDR signals 721, 722 to pad the data rates of the two SDR signals 721, 722, initially at 2.5 Gbps, in order to have a combined data rate associated with the data rate of the resulting QDR signal 723 (10 Gbps). The resulting QDR signal 723 may be transmitted via a QDR Infiniband port configured as a transmitter.

Referring again to FIG. 7, in particular embodiments, two No Link streams 731, 732 may be combined onto a single QDR stream 733 through time division multiplexing 730. More specifically, in particular embodiments, No Link streams 731, 732 may be filled with K.28.6 control symbols, and after being multiplexed, the resulting QDR stream 733 may also be filled with K.28.6 control symbols. The resulting data stream filled with K.28.6 control symbols in particular embodiments provides an indication of a No Link, or idle, state.

Figure 8:
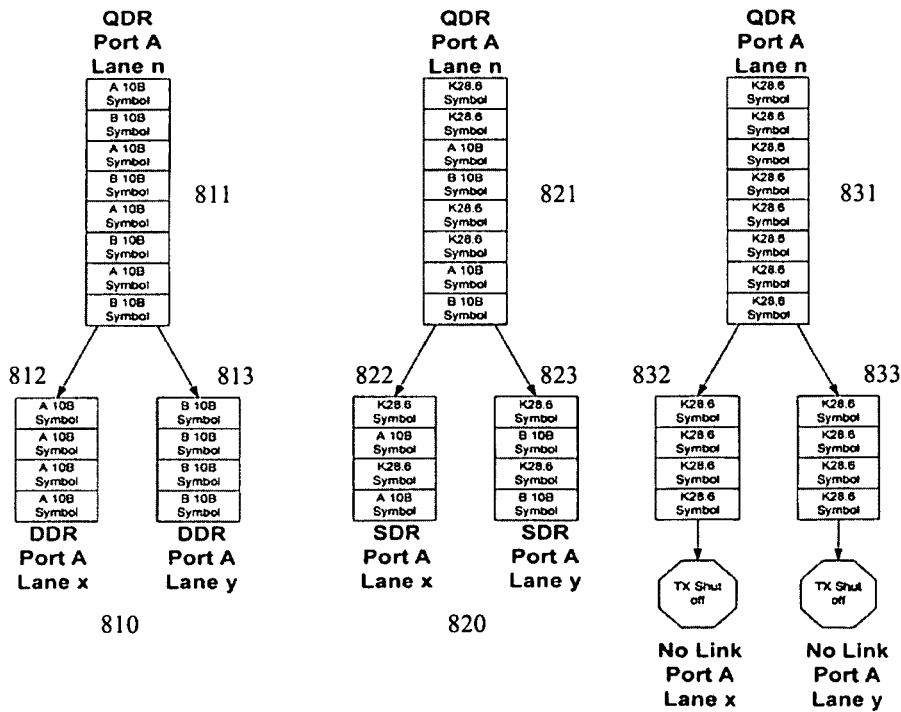
FIG. 8 is an example representation of time division multiplexing of a signal with high speed Infiniband port configured as a receiver in one embodiment.

FIG. 8 is an example representation of the time division multiplexing of a signal wherein the high speed Infiniband port is configured as a receiver. Referring to FIG. 8, in particular embodiments, a single QDR stream 811 may be split into two corresponding DDR data streams 812, 813 through time division de-multiplexing 810. More specifically, the alternating symbols of the QDR stream 811 in particular embodiments may be time division de-multiplexed resulting in a pair of corresponding data streams, DDR stream A 812 and DDR stream B 813. In turn, the two resulting DDR streams 812, 813 may be transmitted via DDR Infiniband ports configured as transmitters.

Still referring to FIG. 8, a single QDR data stream 821 may be split into two SDR streams 822, 823 thorough the process of time division de-multiplexing 820. More specifically, the alternating symbols of the QDR stream 821 may be time division de-multiplexed resulting in a pair of data streams corresponding to SDR stream A 822 and SDR stream B 823, each of which are padded with corresponding K.28.6 control symbols. In particular embodiments the K.28.6 control symbols may be removed, and the two SDR streams 822, 823 may be transmitted via SDR Infiniband ports configured as transmitters.

Referring again to FIG. 8, a single QDR stream 831 may be split into two No Link streams 832, 833 through the process of time division de-multiplexing 830. More particularly, in this example, the QDR stream 831 entirely composed of K.28.6 control symbols may be time division de-multiplexed into two corresponding No Link streams 832, 833 filled with K.28.6 control symbols. As discussed above, the resulting data streams including only the K.28.6 control symbols may be used as notification to turn off the lower data rate ports configured as transmitters.

In the manner described above, in particular embodiments, multiple single or double data rate Infiniband ports may be time division multiplexed into a corresponding single double or quad data rate Infiniband port to optimize the use of the higher bandwidth provided by the higher rate port. Time division multiplexing the stream at an interval smaller than the frame length allows low latency multiplexing as the entire frame does not need to be buffered before it is transmitted on the higher data rate port.

Accordingly, in particular embodiments, multiple lower rate Infiniband ports, such as single data rate or double data rate Infiniband ports, may be time division multiplexed to aggregate the two or more data streams onto a single higher rate Infiniband port, such as a double data rate or quad data rate Infiniband port. The data is time division multiplexed into the higher data rate port at an interval smaller than the frame length. Time division multiplexing the stream at an interval smaller than the frame length provides for low latency multiplexing as the entire frame does not need to be buffered before it is transmitted on the higher data rate port. Further, the combining of the two streams may be performed at the physical link layer, avoiding any complication associated with decoding the signals.

Additionally, a control symbol (K.28.6) of the 10B code of the Infiniband signal may be introduced to compensate for the obstacles presented by the quiescent periods during initialization that Infiniband uses. These control symbols are used to denote the quiescent periods where no signal is present on the wire, where if these periods were not encoded, the time division multiplexed combined version of the signals will have symbols directly followed by quiescent periods. Moreover, in particular embodiments, the K.28.6 control symbols may be used to pad the data stream as desired.

In one embodiment of the present disclosure, a method may comprise receiving one or more Infiniband signal streams, de-serializing the received one or more Infiniband signal streams to generate a corresponding one or more parallel data streams, de-serializing further including selectively adding or deleting a control symbol associated with a quiescent period of the one or more received signal streams, time-division multiplexing the generated one or more parallel data streams, and serializing the time division multiplexed one or more parallel data streams.

In one aspect the serialized time division multiplexed one or more parallel data streams may include an output signal stream having a data rate higher than the data rate of the received one or more Infiniband signal streams.

The received one or more Infiniband signal streams may be double data rate Infiniband signal streams.

The received one or more Infiniband signal streams may be single data rate Infiniband signal streams.

Further, the control symbol may be padded to one or more of the received one or more Infiniband signal streams, wherein the combined data rate of the received one or more Infiniband signal streams after being padded with the control symbol, is substantially equal to the data rate of the serialized multiplexed one or more parallel data streams.

In another aspect, the time division multiplexed one or more parallel data streams may include two or more output signal streams, wherein the two or more output signal streams each have a data rate lower than the data rate of the received one or more Infiniband signal streams.

The received one or more Infiniband signal streams may be a quad data rate Infiniband signal stream.

The received one or more Infiniband signal streams may be a double data rate Infiniband signal stream.

A further aspect may comprise detecting and selectively removing the control symbol from the time division multiplexed one or more parallel data streams.

In yet a further aspect, when the time division multiplexed one or more parallel data streams are comprised entirely of the control symbols, the received one or more Infiniband signal streams may be an idle stream.

Another aspect may comprise transmitting the serialized time division multiplexed one or more parallel data streams.

In another embodiment, an apparatus may comprise an input Infiniband network communications interface configured to receive one or more Infiniband signal streams, a processing and control unit operatively coupled to the input Infiniband network communication interface, the processing and control unit configured to de-serialize the received one or more Infiniband signal streams to generate a corresponding one or more parallel data streams, wherein de-serializing includes selectively adding or deleting a control symbol associated with a quiescent period of the one or more received signal streams, to time-division multiplex the generated one or more parallel data streams, and to serialize the time division multiplexed one or more parallel data streams, and an output Infiniband network communication interface operatively coupled to the processing and control unit configured to output one or more of the serialized parallel data streams.

In one aspect, the serialized time division multiplexed one or more parallel data streams may include an output signal stream having a data rate higher than the data rate of the received one or more Infiniband signal streams.

Further, the processing and control unit may be configured to pad the control symbol to one or more of the received one or more Infiniband signal streams, wherein the combined data rate of the received one or more Infiniband signal streams after being padded with the control symbol is substantially equal to the data rate of the serialized multiplexed one or more parallel data streams.

In another aspect, the time division multiplexed one or more parallel data streams may include two or more output signal streams, wherein the two or more output signal streams each have a data rate lower than the data rate of the received one or more Infiniband signal streams.

In yet another aspect, when the time division multiplexed one or more parallel data streams are comprised entirely of control symbols, the received one or more Infiniband signal streams is an idle stream.

The input Infiniband network communication interface may include one or more of a single data rate Infiniband port, a double data rate Infiniband port, or a quad data rate Infiniband port, and the output Infiniband network communication interface may include one or more of a single data rate Infiniband port, a double data rate Infiniband port, or a quad data rate Infiniband port.

In another embodiment, an apparatus may comprise, a means for receiving one or more Infiniband signal streams, a means for de-serializing the received one or more Infiniband signal streams to generate a corresponding one or more parallel data streams, means for de-serializing further including means for selectively adding or deleting a control symbol associated with a quiescent period of the one or more received signal streams, a means for time-division multiplexing the generated one or more parallel data streams, and a means for serializing the time division multiplexed one or more parallel data streams.

Various other modifications and alterations in the structure and method of operation of this disclosure will be apparent to those skilled in the art without departing from the scope and spirit of the disclosure. Although the disclosure has been described in connection with specific preferred embodiments, it should be understood that the disclosure as claimed should not be unduly limited to such specific embodiments. It is intended that the following claims define the scope of the present disclosure and that structures and methods within the scope of these claims and their equivalents be covered thereby.

What is claimed is:

1. A method, comprising
    receiving an Infiniband signal stream with no quiescent periods on a second Infiniband port of a switch, the received Infiniband signal stream having a second data rate;
    de-serializing the received Infiniband signal stream to generate a parallel data stream, the de-serialized parallel data stream composed of alternating Infiniband 8B/10B symbols or added control symbols;
    time-division de-multiplexing the parallel data stream to recover a plurality of de- multiplexed Infiniband signal streams;
    detecting a predefined percentage of control symbols in the plurality of de-multiplexed Infiniband signal streams;
    in response to the detecting, determining a data rate of each of a plurality of Infiniband signal streams that have been encoded into the received Infiniband signal stream;
    selectively removing the control symbols from the plurality of de-multiplexed Infiniband signal streams;
    serializing the plurality of de-multiplexed Infiniband signal streams to produce a plurality of Infiniband signal streams; and
    transmitting the plurality of Infiniband signal streams from respective first Infiniband ports of the switch, the plurality of Infiniband signal streams having a first data rate that is lower than the second data rate.

2. The method of claim 1, wherein the received Infiniband signal stream comprises a quad data rate Infiniband signal stream.

3. The method of claim 1, wherein the received Infiniband signal stream comprises a double data rate Infiniband signal stream.

4. The method of claim 1, wherein when the plurality of de-multiplexed Infiniband signal streams are comprised entirely of the control symbols, the received Infiniband signal stream is an idle stream.

5. The method of claim 1, wherein the control symbols are K.28.6 symbols.

6. An apparatus, comprising:
    a plurality of Infiniband ports including a plurality of first Infiniband ports and a second Infiniband port; and
    a processing and control unit operatively coupled to the plurality of Infiniband ports, the processing and control unit configured to:
    receive an Infiniband signal stream with no quiescent periods via the second Infiniband port, the received Infiniband signal stream having a second data rate,
    de-serialize the received Infiniband signal stream to generate a parallel data stream, the de-serialized parallel data stream composed of alternating Infiniband 8B/10B symbols or added control symbols,
    time-division de-multiplex the parallel data stream to recover a plurality of de-multiplexed Infiniband signal streams,
    detect the presence of at least a predefined percentage of control symbols in the plurality of de-multiplexed Infiniband signal streams,
    in response to the detection, determine a data rate of each of a plurality of Infiniband signal streams that have been encoded into the received Infiniband signal stream,
    selectively remove the control symbols from the plurality of de-multiplexed Infiniband signal streams,
    serialize the plurality of de-multiplexed Infiniband signal streams to produce a plurality of Infiniband signal streams, and
    transmit the plurality of Infiniband signal streams via respective first Infiniband ports, the plurality of Infiniband signal streams having a first data rate that is lower than the second data rate.

7. The apparatus of claim 6, wherein the control symbols are K.28.6 symbols.

8. The apparatus of claim 6, wherein the first data rate is Infiniband single data rate (SDR) and the second data rate is Infiniband double data rate (DDR) or quad data rate (QDR).

9. The apparatus of claim 6, wherein the processing and control unit is further configured to:
    detect that the plurality of de-multiplexed Infiniband signal streams are entirely composed of control symbols, and conclude the received Infiniband signal stream is currently an idle stream.

10. The apparatus of claim 7, wherein the processing and control unit is further configured to:
   in response to the received Infiniband signal stream being concluded to be an idle stream, turn off one or more transmitters associated with the first Infiniband ports.

11. A non-transitory computer-readable medium having instructions encoded thereon, the instructions when executed operable to:
   de-serialize a received Infiniband signal stream having a second data rate, to generate a parallel data stream, the de-serialized parallel data stream composed of alternating Infiniband 8B/10B symbols or added control symbols;
   time-division de-multiplex the parallel data stream to recover a plurality of de-multiplexed Infiniband signal streams;
   detect the presence of at least a predefined percentage of control symbols in the plurality of de-multiplexed Infiniband signal streams;
   in response to the detection, selectively remove the control symbols from the plurality of de-multiplexed Infiniband signal streams; and
   serialize the plurality of de-multiplexed Infiniband signal streams to produce a plurality of Infiniband signal streams, the plurality of Infiniband signal streams having a first data rate that is lower than the second data rate.

12. The non-transitory computer-readable medium of claim 11, wherein the control symbols are K.28.6 symbols.

13. The non-transitory computer-readable medium of claim 11, wherein the first data rate is Infiniband single data rate (SDR) and the second data rate is Infiniband double data rate (DDR) or quad data rate (QDR).

14. The non-transitory computer-readable medium of claim 11, wherein the instructions when executed are further operable to:
   detect that the plurality of de-multiplexed Infiniband signal streams are entirely composed of control symbols; and
   conclude the received Infiniband signal stream is currently an idle stream.

15. The non-transitory computer-readable medium of claim 14, wherein the instructions when executed are further operable to:
   in response to the received Infiniband signal stream being concluded to be an idle stream, turn off one or more transmitters.

* * * * *

UNITED STATES PATENT AND TRADEMARK OFFICE
CERTIFICATE OF CORRECTION

PATENT NO. : 8,472,482 B2  Page 1 of 1
APPLICATION NO. : 12/259260
DATED : June 25, 2013
INVENTOR(S) : Carreta et al.

It is certified that error appears in the above-identified patent and that said Letters Patent is hereby corrected as shown below:

In the Specification

Col. 3, line 41 should read: "data rate port ~~3 10~~ 310. Referring to FIG. 3, the higher rate Infini-"

Col. 3, line 54 should read: "band port ~~3 10~~ 310. Further, in particular embodiments, and SDR"

Signed and Sealed this
First Day of October, 2013

Teresa Stanek Rea
*Deputy Director of the United States Patent and Trademark Office*